United States Patent [19]
Boutet et al.

[11] Patent Number: 5,386,125
[45] Date of Patent: * Jan. 31, 1995

[54] ENTRANCE GUIDES FOR CASSETTE AUTOLOADER

[75] Inventors: John C. Boutet, Rochester; Stephen G. Dowe, Holley; Blaise P. Pelligra, Webster, all of N.Y.

[73] Assignee: Eastman Kodak Company, Rochester, N.Y.

[*] Notice: The portion of the term of this patent subsequent to Aug. 2, 2011 has been disclaimed.

[21] Appl. No.: 97,825
[22] Filed: Jul. 27, 1993
[51] Int. Cl.⁶ .................................................. G03B 42/02
[52] U.S. Cl. ....................................... 250/589; 414/411
[58] Field of Search ............................ 250/589, 484.4; 378/172; 414/411

[56] References Cited

U.S. PATENT DOCUMENTS

| | | | |
|---|---|---|---|
| 924,700 | 6/1909 | Stegmaier | 312/234.1 |
| 1,688,224 | 9/1927 | Bell | 312/9.48 |
| 1,967,666 | 7/1934 | Fisher | 108/27 |
| 2,379,793 | 7/1945 | Eenigenburg | 264/275 |
| 2,496,221 | 1/1950 | Koch | 312/204 |
| 3,069,213 | 12/1962 | Azzarri | 312/9.48 |
| 3,167,873 | 2/1965 | Toms | 40/124.2 |
| 3,181,922 | 5/1965 | McBean | 312/234.1 |
| 3,660,211 | 5/1972 | Brody | 428/67 |
| 4,040,670 | 9/1977 | Williams | 301/5.3 |
| 4,552,913 | 11/1985 | Wolfe et al. | 524/240 |
| 4,615,276 | 10/1986 | Garabedian | 108/61 |
| 4,665,003 | 5/1987 | Matsuda et al. | 430/139 |
| 4,901,868 | 2/1990 | Utsumi et al. | 211/51 |
| 5,056,669 | 10/1991 | Villeneuve | 211/40 |
| 5,207,336 | 5/1993 | Tyler | 211/183 |
| 5,276,333 | 1/1994 | Robertson | 250/484.4 |
| 5,278,410 | 6/1994 | Boutet et al. | 250/589 |

*Primary Examiner*—Constantine Hannaher
*Attorney, Agent, or Firm*—Dana M. Schmidt

[57] ABSTRACT

A cassette storage and delivery apparatus having a plurality of cassette retaining sites. The apparatus having a body having a portal adjoining the cassette sites for allowing the cassettes to be placed onto or removed from the cassette retaining sites. The apparatus further includes a pair of guide panels, one on each side of the portal. The guide panels each having a guide surface. The guide surface is provided with a shock absorbing protective layer.

26 Claims, 17 Drawing Sheets

ENTRANCE GUIDES FOR CASSETTE AUTOLOADER

CROSS-REFERENCE TO RELATED APPLICATION

Reference is made to Ser. No. 07/981,640, entitled "Cassette Autoloader", filed Nov. 25, 1992, in the name of John C. Boutet et al.

BACKGROUND OF THE INVENTION

The present invention pertains to equipment used in processing photosensitive material, and more particularly, to an autoloader for feeding cassettes and/or pallets containing cassettes to and receiving them from a computed radiography reader.

In computed radiography, a storage phosphor plate/film is typically provided in a light-tight cassette. This storage phosphor film is read by photoelectrically detecting an image formed by scanning the plate with stimulating radiation. An example of such a scanner/reader is disclosed in U.S. Pat. No. 4,789,782 to T. O'Hara. It is desirable to retain the storage phosphor's plate/film within the cassette except during actual processing. It has also been suggested in the prior art to provide an apparatus to automate the presentation on such x-ray cassettes or similar cassette to the reader so that the x-ray cassettes can be processed in succession without the attention of an operator. An example of a suitable device for presenting cassettes is disclosed in copending U.S. application Ser. No. 07/981,640, filed Nov. 25, 1992, entitled "*Cassette Autoloader*", of John C. Boutet et al.; and U.S. Ser. No. 07/902,214, filed Jun. 22, 1992, entitled "*X-Ray Cassette Positioner*", of John C. Boutet et al now U.S. Pat. No. 5,278,410. Both of these applications are hereby incorporated by reference. In these applications there is disclosed, a positioner/autoloader for use with a plurality of x-ray cassettes and/or pallets containing cassettes. The apparatus includes first and second cog belts spaced apart so as to provide a plurality of cassette retaining sites, one of which defines a cassette presentation site for presenting cassettes to the reader. The belts are driven such that the cassettes are individually positioned at the presentation site for removal of the photosensitive material therein for reading by the reader after which the photosensitive material is returned to the cassette. The positioner allows a plurality of individual cassettes to be placed on the cassette retaining sites for automatically supplying to the reader individual cassettes in succession, thus freeing the operator to accomplish other duties. It is important that the mechanism be designed to operate in such manner so as to minimize any transfer of vibrations from the autoloader to the reader which can adversely affect the reader reading the information on the photostimulable phosphorous material. In such devices, it is typical that the autoloader will be loaded and/or unloaded during scanning of a photostimulable phosphorous material in the adjacent reader. Often the loading and unloading procedure produces shock vibrations which can be transmitted to the adjacent reader. Since the reader is very sensitive to these vibrations, it is desirable to eliminate or minimize the transmission of these vibrations.

The cassettes are manually loaded and unloaded from the cassette loading and unloading site. Typically, the operator will be loading and/or unloading a plurality of cassettes. During this procedure, the operator must align the sides of the cassette with the horizontally aligned spaced shelves. In order to assist the operator in properly inserting the cassettes into the cassette site, there is provided a pair of guide panels each having identifying indicia for identifying the cassette sites which are located adjacent the cassette loading and unloading site. It has also been suggested that the guide panels be mounted to the autoloader by appropriate vibration insulation mounts as described in copending U.S. application Ser. No. 07/981,640, previously referred to. While guide panels disclosed in this application have provided certain advantages, there exists a problem that the indicia provided on the guide panels will become worn during use. Typically, as cassettes are inserted into and removed from the autoloader, the cassettes will hit the guide panels, thus, producing undesirable shock vibrations and abrading the indicia on the guide panels. While the prior art guide panels have provided improvements in isolating vibration experienced by the autoloader from transferring to the adjacent reader, further improvements in vibration isolation is desirable.

Thus, it is important to provide increased shock absorbency to minimize the possibility of vibration transfer to the reader from the autoloader. It is also important to provide a guide panel which has indicia which is more resistant to wear and abrasion.

Applicants have invented an improved autoloader which provides means for minimizing abrasion to the indicia, provided on the guide panels, thus prolonging the visual effectiveness of the indicia. Means are also provided for further minimizing any potential shock vibrations that may be experienced by the autoloader and transmitted to the reader. In addition, the guide panels are easy to manufacture and install. Means are provided for minimum potential interference of the fastening used to secure the guide panels to the autoloader.

SUMMARY OF THE INVENTION

In accordance with one aspect of the present invention there is provided an apparatus comprising a storage and delivery mechanism having a plurality of cassette retaining sites. The apparatus includes a body having a portal adjoining the cassette sites for allowing the cassettes to be placed onto or removed from the storage delivery mechanism. The apparatus further includes a pair of guide panels, one on each side of the portal. The guide panels each having a guide surface which is provided with a shock absorbing protective layer.

In accordance with another aspect of the present invention, there is provided an apparatus for storing and automatically delivering cassettes and/or pallets containing cassettes to a reader. The apparatus includes a storage and delivery mechanism which defines a plurality of cassette retaining sites in a body which encloses the storage and delivery mechanism. The body includes a portal which adjoins the cassette site and allows the cassette to be placed onto or removed from the storage and delivery mechanism. The apparatus further includes a pair of guide panels secured to the body which are located adjacent to the portal. The guide panels each have indicia thereon for identifying cassette retaining sites. The guide panels are substantially encapsulated in a plastic/elastomeric material.

In accordance with yet another aspect of the present invention there is provided an apparatus for storing and automatically delivering cassettes and/or pallets containing cassettes to a reader. The apparatus includes a storage and delivery mechanism which defines a plurality of cassette retaining sites and a body which encloses the storage and delivery mechanism. The body includes a portal which allows cassettes to be placed onto or removed from the storage and delivery mechanism. The apparatus further includes a pair of guide panels, one on each side of the portal. The guide panels each have a mounting insert. The mounting inserts are vibration isolation mounted to its associated guide panels. The guard bar is secured to the mounting inserts for covering one of the cassette retaining sites.

In yet still another aspect of the present invention there is provided an apparatus for storing and automatically delivering cassettes and/or pallets containing cassettes to a reader. The apparatus comprises a storage and delivery mechanism which defines a plurality of cassette retaining sites in a body enclosing the storage and delivery mechanism. The body includes a portal which adjoins the cassette sites for allowing the cassettes to be placed onto or removed from the storage delivery mechanism. A pair of guide panels are provided on each side of the portal. Each panel is provided with means for capturing and retaining in position a fastening member used to secure the panel to the body.

In accordance with another aspect of the present invention, there is provided an apparatus for storing and automatically delivering cassettes and/or pallets containing cassettes to a reader. The apparatus includes a storage and delivery mechanism which defines a plurality of cassette retaining sites and a body enclosing the storage and delivery mechanism. The body is provided with a portal for allowing cassettes to be placed on or removed from the storage and delivery mechanism. A pair of guide panels are provided, one on each side of the portal. The guide panels are each substantially encased in a plastic/elastomeric material. A mounting section for mounting of the panel to the body is integrally formed in the plastic/elastomeric material.

DETAILED DESCRIPTION OF THE DRAWINGS

In the Detailed Description of the preferred embodiment of the invention presented below, reference is made to the accompanying drawings in which.

DETAILED DESCRIPTION OF THE INVENTION

Figure 1:
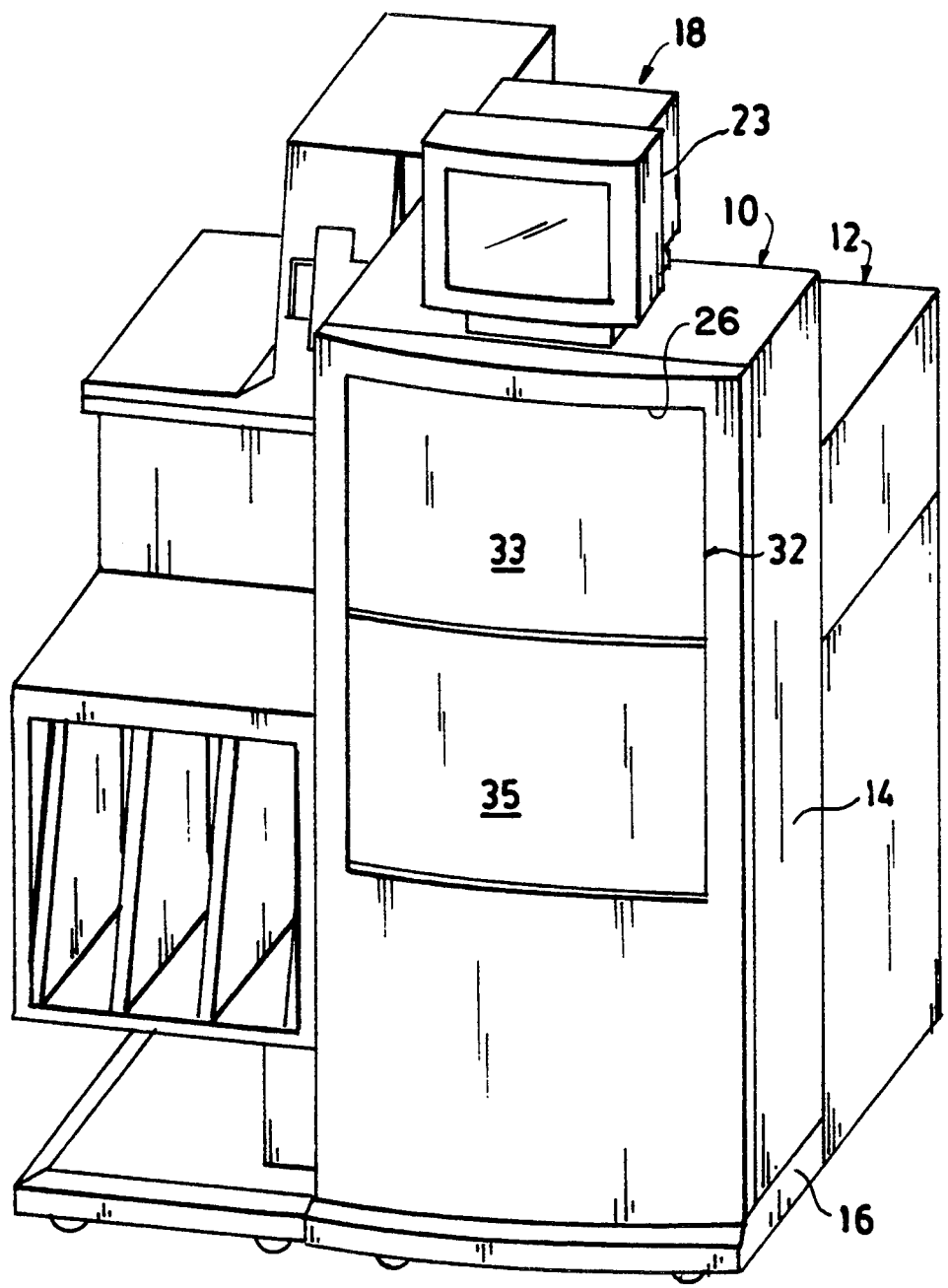
FIG. 1 is a front perspective view of an x-ray cassette autoloader made in accordance with the present invention, along with an x-ray reader and monitor.
Figure 2:
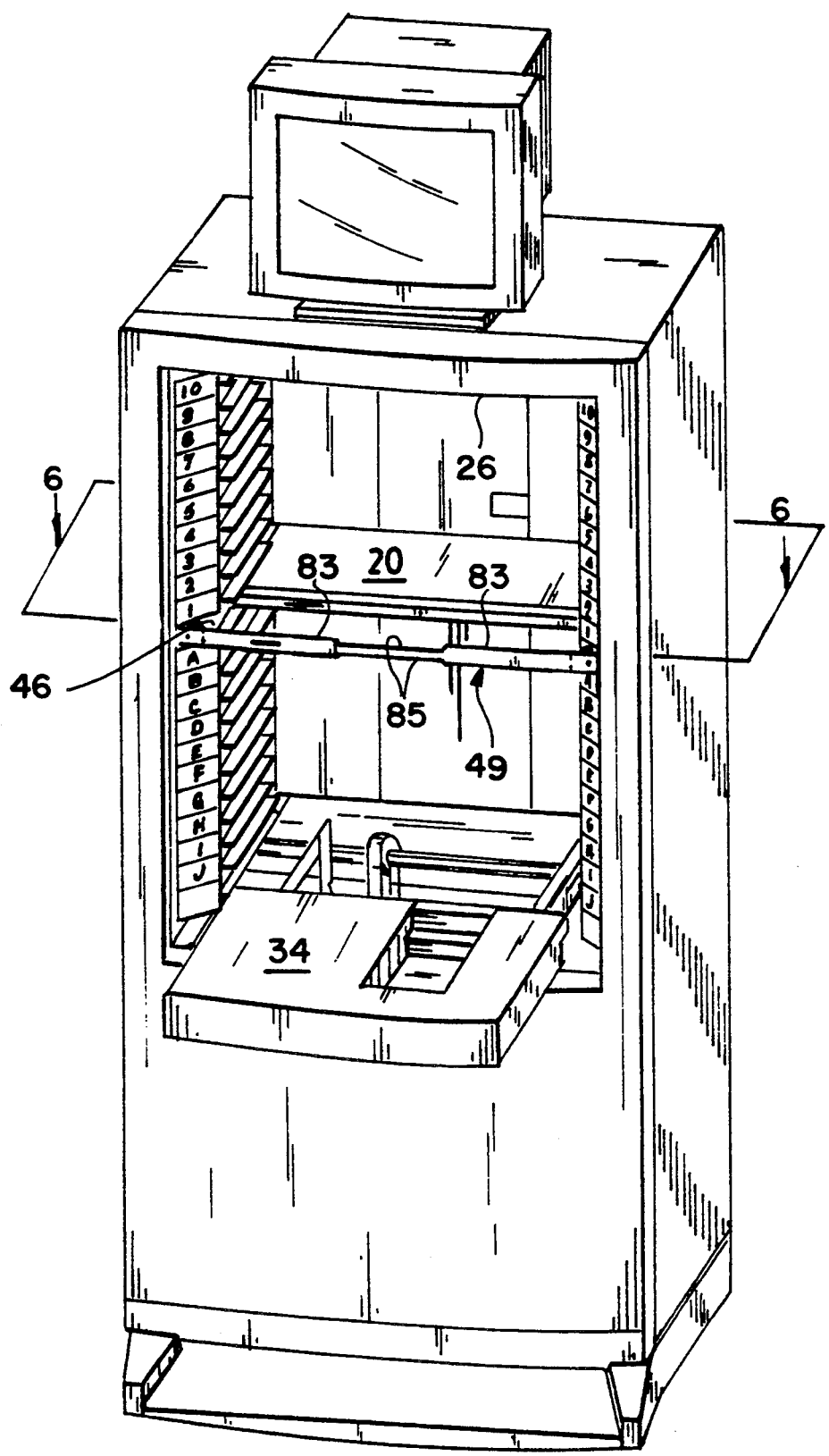
FIG. 2 is a view similar to FIG. 1 illustrating the autoloader with the door assembly in the open position and table extended.
Figure 3:
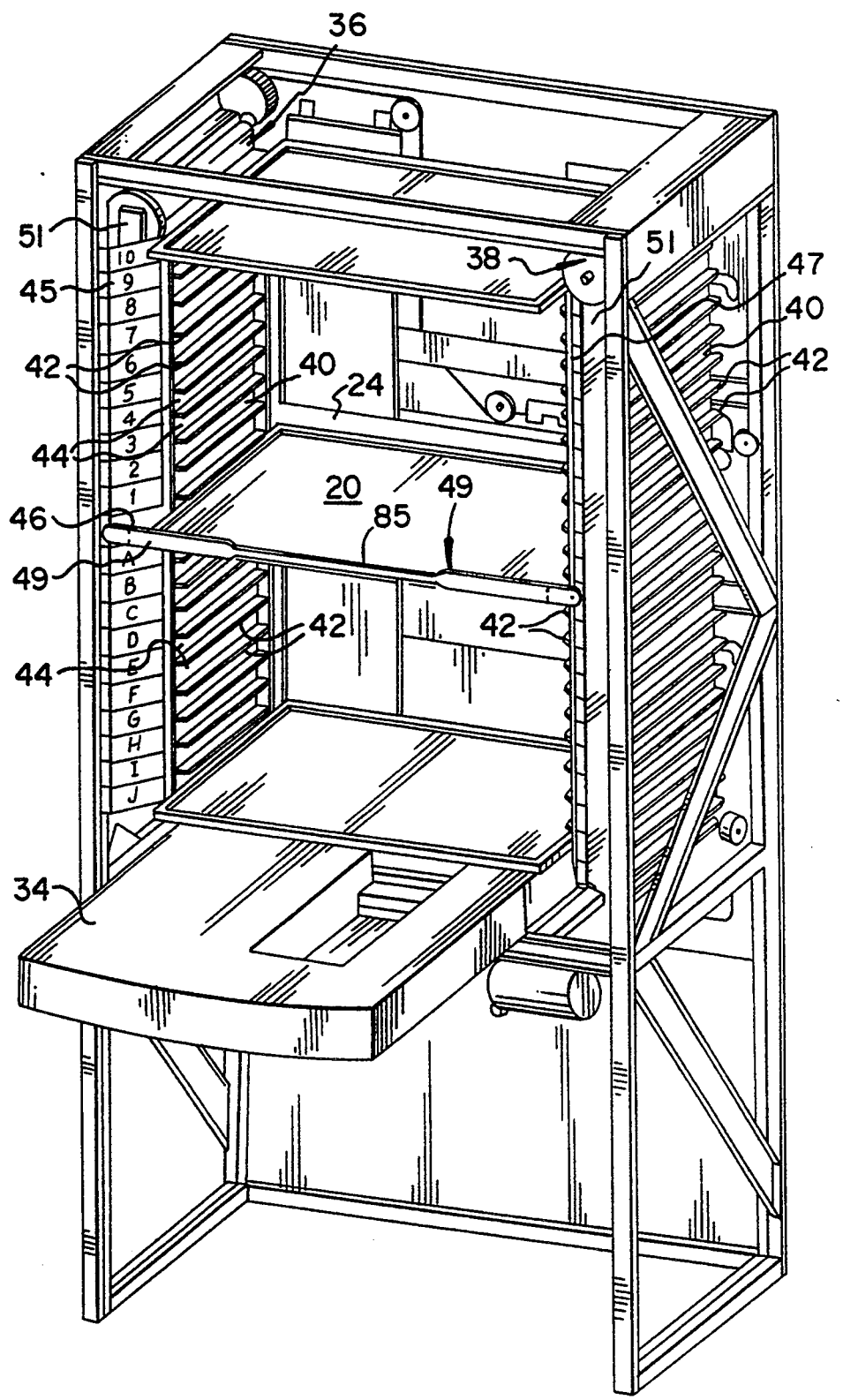
FIG. 3 is a view similar to FIG. 2 illustrating the autoloader with the outer body removed.

Referring to FIG. 1 there is illustrated an autoloader (10), made in accordance with the present invention positioned directly in front of an x-ray reader (12). FIGS. 2 and 3 illustrate the autoloader 10 by itself. The autoloader (10) has a body (14) with a base (16) at the bottom and a monitor station (18) on top. The body (14) can be made of sheet metal or the like reinforced as necessary to support loads imposed by the autoloader components and x-ray cassettes (20) or pallets containing cassettes. The cassette (20) is of the type wherein the photosensitive material is removed through one of the sides of the cassette such as that described in pending application of Jeffrey C. Robertson, U.S. Ser. No. 800,799, filed Nov. 27, 1991, entitled "X-Ray Cassette Having Removable Photographic Element" now U.S. Pat. No. 5,276,333, which is hereby incorporated by reference. Briefly, the cassette comprises a shell having upper and lower panels and three side caps joining the upper and lower panels, and a removable end cap. A photographic element, such as a stimulable phosphor plate, is provided within the cassette and is secured to the removable end cap. The end cap includes a latching mechanism for releasing the end cap from the cassette. A latch bar having at least one hook is used to latch or unlatch the latching mechanism. It is to be understood that other cassette construction may be used as appropriate, such as that disclosed in U.S. Pat. No. 5,065,866 and U.S. Pat. No. 5,090,567. At the rear, body (14) has an access opening (24), as best seen by reference to FIG. 3, through which the forward end of a cassette is passed so that the forward end of the cassette (20) is placed within the adjacent x-ray reader (12). At the front, body (14) has a portal (26) which is generally rectangular in shape and provides access to the interior of body (14). Facing portal (26) is an operator station, which may be occupied by an operator. Door assembly (32) of body (14) is operable between a closed position, as shown in FIG. 1, in which the portal (26) is closed, and in an open position, as shown in FIG. 2, in which the interior of body (14) is accessible through portal (26). The operation and function of door assembly (32) is set forth in greater detail in copending application entitled "Door Assembly For Cassette Autoloader" filed Nov. 25, 1992, Ser. No. 07/981,674 of Wayne Arseneault et al now U.S. Pat. No. 5,319,217, which is hereby incorporated by reference. Briefly, the door assembly includes a pair of panels (33),(35) slideably mounted to body (14) such that when in the closed position the portal (26) is closed. However, for the purpose of this invention, any door assembly desired may utilized.

Autoloader (10) includes a retractable table (34), which can be moved between an extended stacking position, as shown in FIG. 2, and a storage retracted position inside body (14). In the storage retracted position, the retractable table (34) is disposed totally within the body (14) so that the door assembly (32) can be closed as shown in FIG. 1. Table (34) can be used to hold x-ray cassettes (20) and/or pallets containing cassettes during loading and unloading. Alternatively, x-ray cassette (20) can be loaded or unloaded from a cart (not shown). Controls are provided to permit the operator to either open the door assembly (32) and have the table (34) extended automatically, or to open only the door (32) without extending of the retractable table. A wide variety of means may be employed for controlling operation of the autoloader which are well known in the prior art. In the particular embodiment illustrated the autoloader is provided with a microprocessor which is appropriately linked up to various switches, motors and controls to operate the door assembly and retractable table and various other functions of the device in a pre-set pattern. Such controls are well known and therefore will not be discussed further.

Referring to FIG. 3, the autoloader is provided with first and second conveyor assemblies (36),(38), respectively. Each conveyor assembly (36), (38) is provided with an endless cog belt (40). Each cog belt (40) having a plurality of regular space shelves (42). The cog belts (40) are aligned and driven such that the shelves (42) provide a plurality of vertically arranged cassette retaining sites (44) within body (14). In line with the center of access opening (24) there is provided a read site (46) whereby the cassette, when placed in such position, can be advanced for reading into the adjacent x-ray reader (12). The cassette retaining sites (44) above reading site (46) are loading sites wherein cassettes which have yet to be read are placed. Cassette retaining sites (44) below read site (46) are unloading sites from which scanned and erased cassettes can be removed. While only one read site is provided, any number of cassette loading and unloading sites may be provided as desired. In the particular embodiment illustrated, there are provided ten loading sites and ten unloading sites. To prevent accidental placement or attempted removal of a cassette from read site (46), a guard bar (49) is secured to body (14) in front of read site 46. Cassettes (20) can be interchanged between loading sites easily since each cassette is supported by a pair of vertically aligned shelves (42), and shelves (42) are spaced apart from each other by a distance sufficient to permit each individual cassette (20) to be gripped while positioned fully to the back of every cassette retaining site (44).

The cog belts (40) are driven in unison by a drive means provided. An example of a mechanism used to drive cog belts (40) is more fully described in copending application U.S. Ser. No. 07/902,214, previously referred to herein. Such mechanism is used to place in seriatim cassettes at the read site for removal of the photosensitive material and delivery to the reader and to unloading sites after the photosensitive material has been returned to the cassette.

Figure 4:
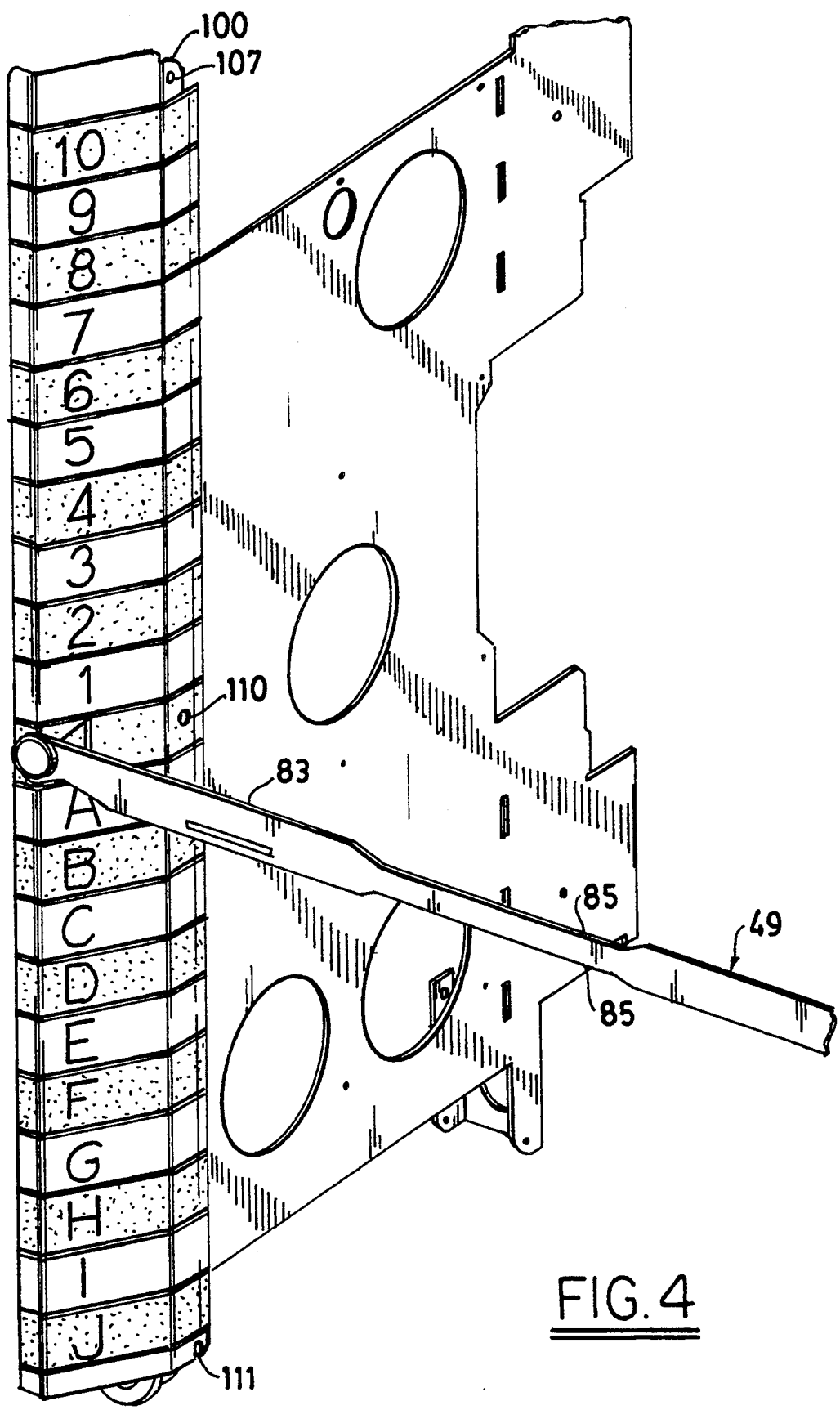
FIG. 4 is an enlarged perspective view of one of the guide panels and a portion of the apparatus to which it is mounted.
Figure 5:
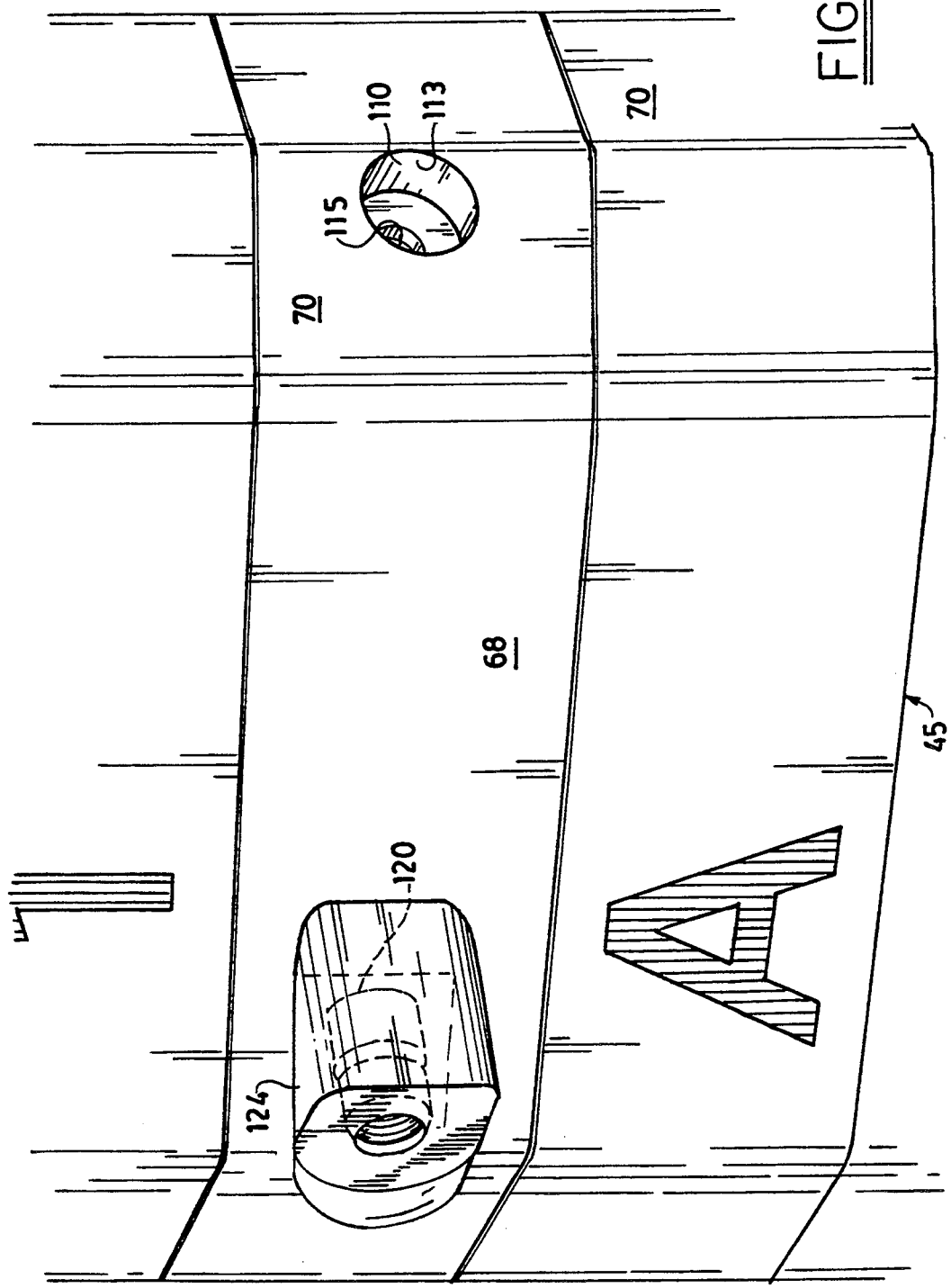
FIG. 5 is a greatly enlarged perspective view of a portion of the panel illustrated in FIG. 4 with the guard bar removed to illustrate how one end of the guard bar is mounted thereto.

To assist in quickly identifying the loading sites and/or unloading sites, the side panels (45), (47) adjacent portal (26) are provided with identifying indicia. In the particular embodiment illustrated the loading sites are identified by numerals 1-10, placed on side panels (45),(47) as shown in FIGS. 3 and 4 and the cassette unloading sites (44) below read site (46) are preferably identified by different indicia from that of loading sites. In the particular embodiment illustrated, the unloading sites are identified by letters and, in particular, by the letters A-J. The indicia on the side panels (45),(47) is such that common indicia on opposed side panels (45),(47) indicate a particular cassette site. For example, the numeral 1 on the side panels (45),(47) indicates the loading site directly above the read site, likewise, the numeral 2 indicates the second loading site above the read site. This sequence is continued for the remainder of the numbers. A cassette in loading site 1 will have the lateral sides in the positions indicated by the numeral 1. This allows the operator to quickly visually align the shelves of one cog belt with the shelves of the opposed cog belt which define a particular cassette retaining site. This also allows the operator to quickly see if a cassette has been improperly placed on the shelves. This further allows the autoloader to identify possible areas where a problem may exist. To further assist in locating individual loading sites, additional indicia may also be used in conjunction with the numerals. In the particular embodiment illustrated in FIG. 4 the even numerals are provided with a different background than that of the odd numerals so as to produce different color stripes and the background for the odd numerals is a white color and the background for the even numerals is a light gray color. The numbers and lines between the numbers are green in color. It is, of course, understood that countless other indicia combinations could be employed. Additionally, the indicia may be provided on the panels in any desired manner, for example, printing, engraving, silk screen process, and use of preprinted labels. In the embodiment illustrated preprinted labels are used.

As previously discussed, letters are used to differentiate the unloading sites from the loading sites. As with the indicia used to identify the loading sites, additional means can be used to identify different unloading sites. In the particular embodiment illustrated, alternate letters "A" "C" "E" "G" and "I" have a white background and the remaining alternate letters have a light gray background. The letters and the lines between the numbers are red in color. To further assist in differentiating loading sites from unloading sites, lines of arrows (not shown) pointing into the portal (26) can be placed between adjacent loading sites and lines of arrows (also not shown) pointing away from portal (26) can be placed between unloading sites.

It is, of course, to be understood that the indicia used to assist the operator identifying the loading site as opposed to the unloading may be varied as desired.

Figure 6:
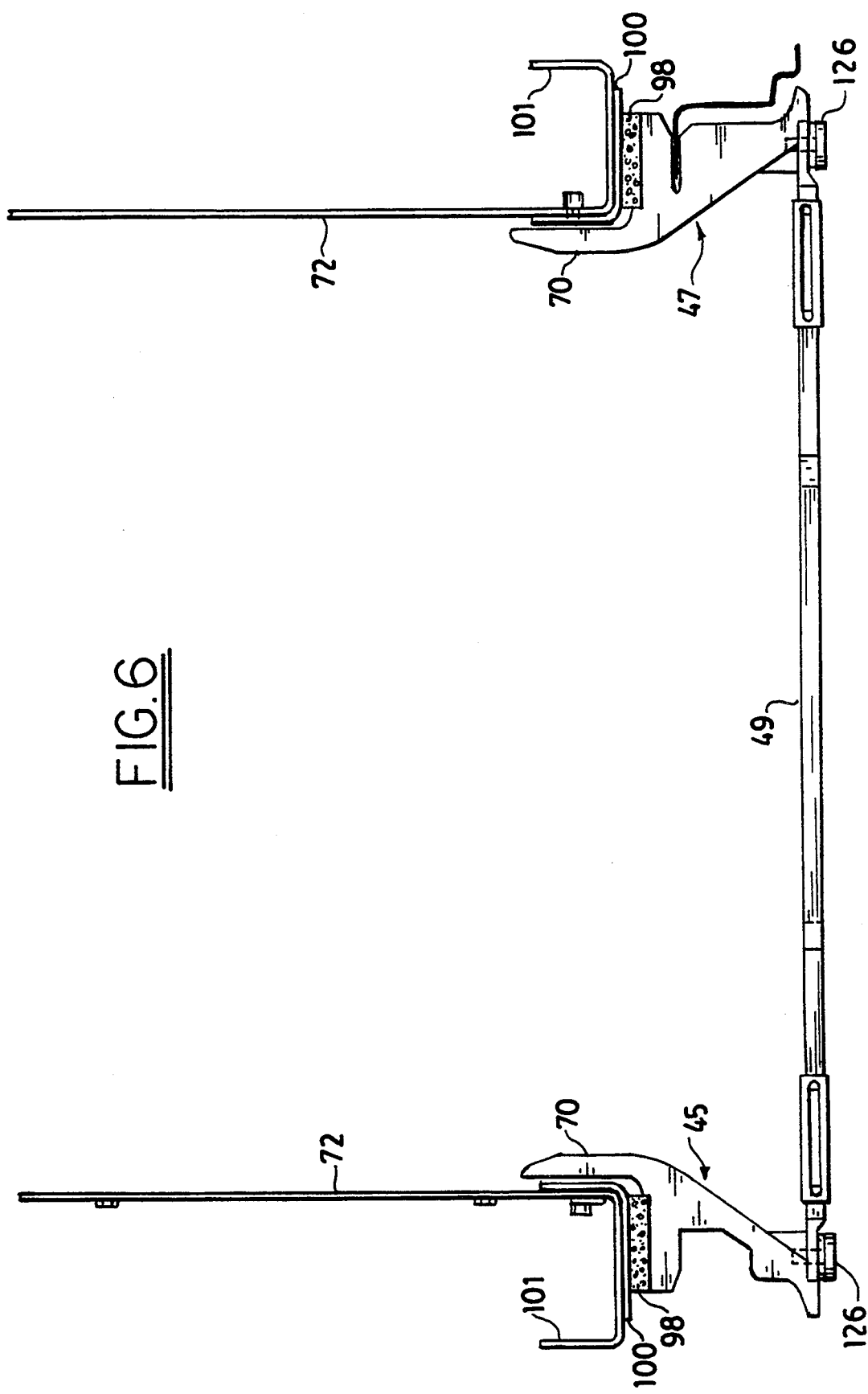
FIG. 6 is a partial cross-sectional view of the apparatus of FIG. 2 as taken along line 6—6.
Figure 7:
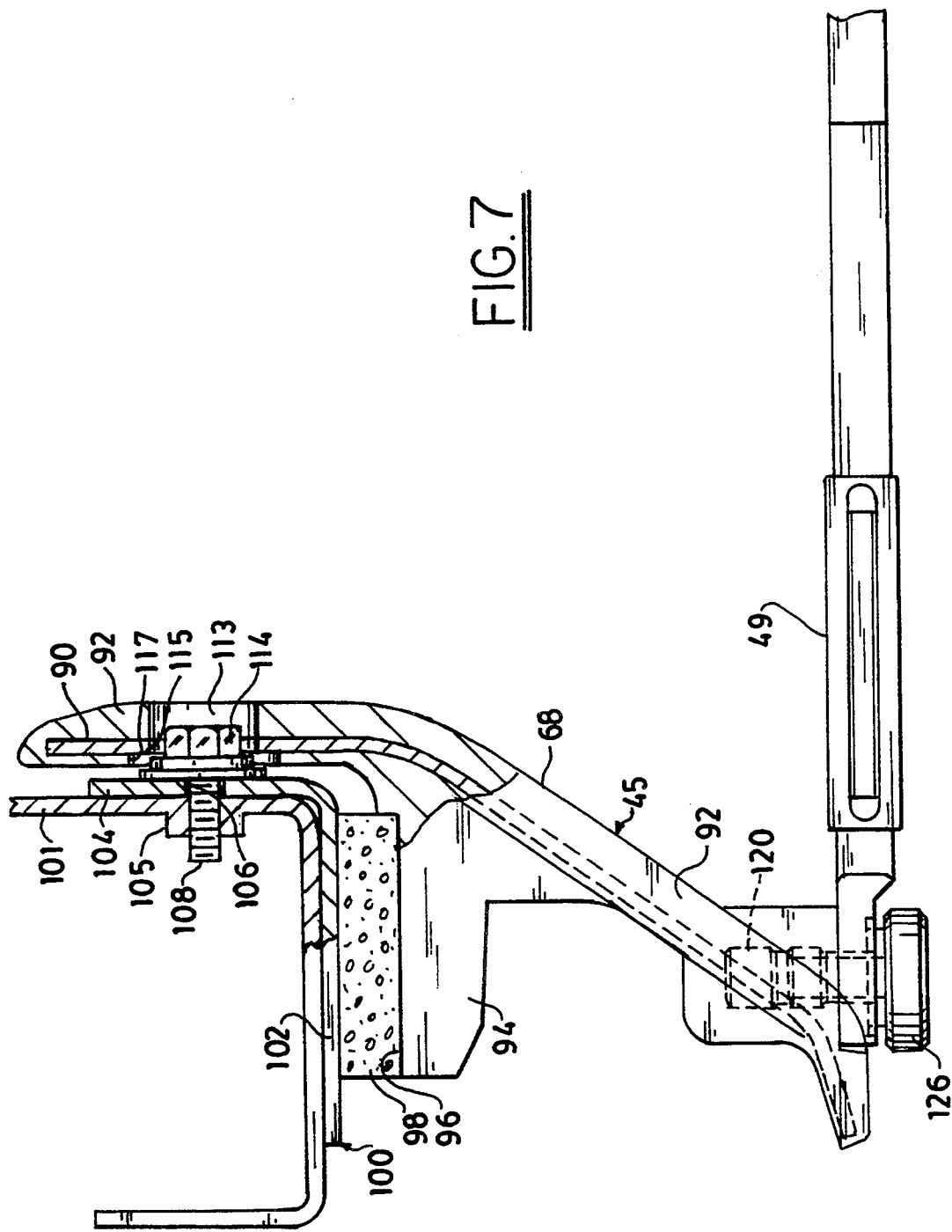
FIG. 7 is an enlarged cross-sectional view of the left entrance guide panel, illustrating how it is mounted to the apparatus and how the guard bar is mounted to the left entrance guide panel.
Figure 8:
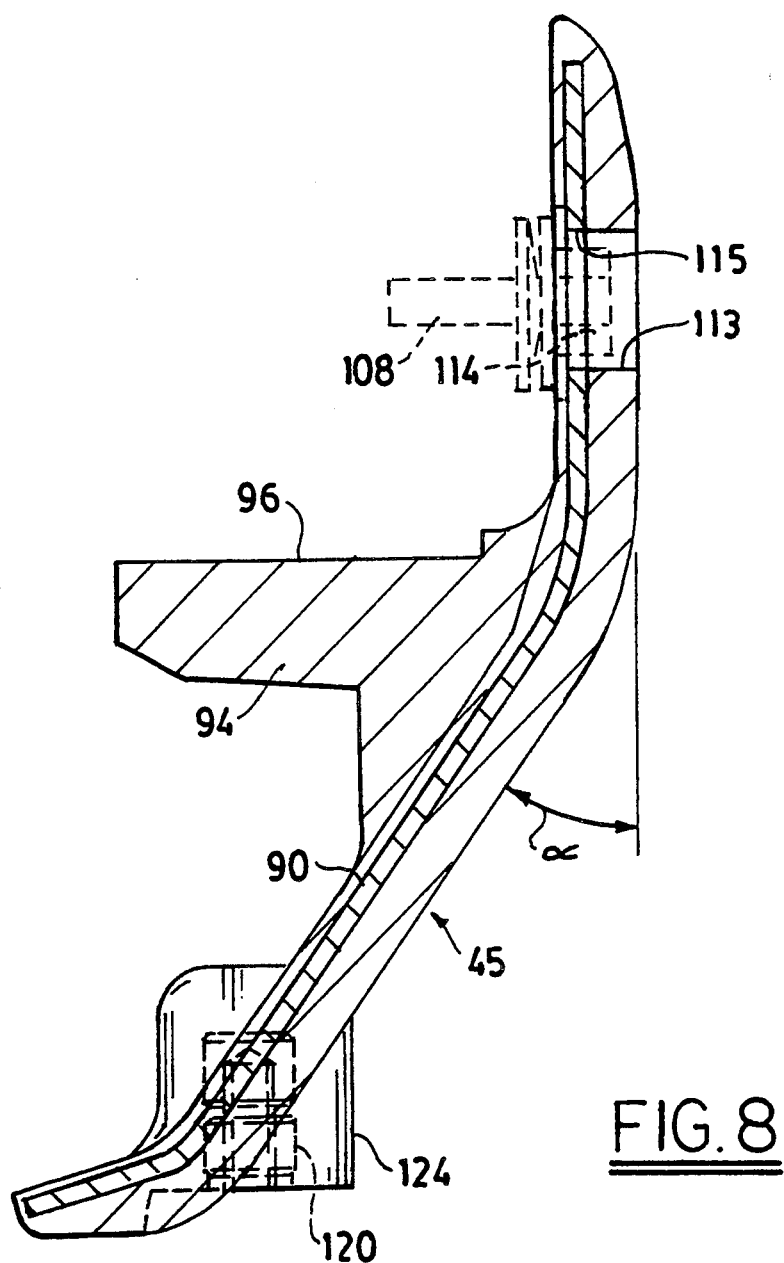
FIG. 8 is a view similar to FIG. 7 illustrating the guide panel by itself and without the mounting pad and bracket.
Figure 9:
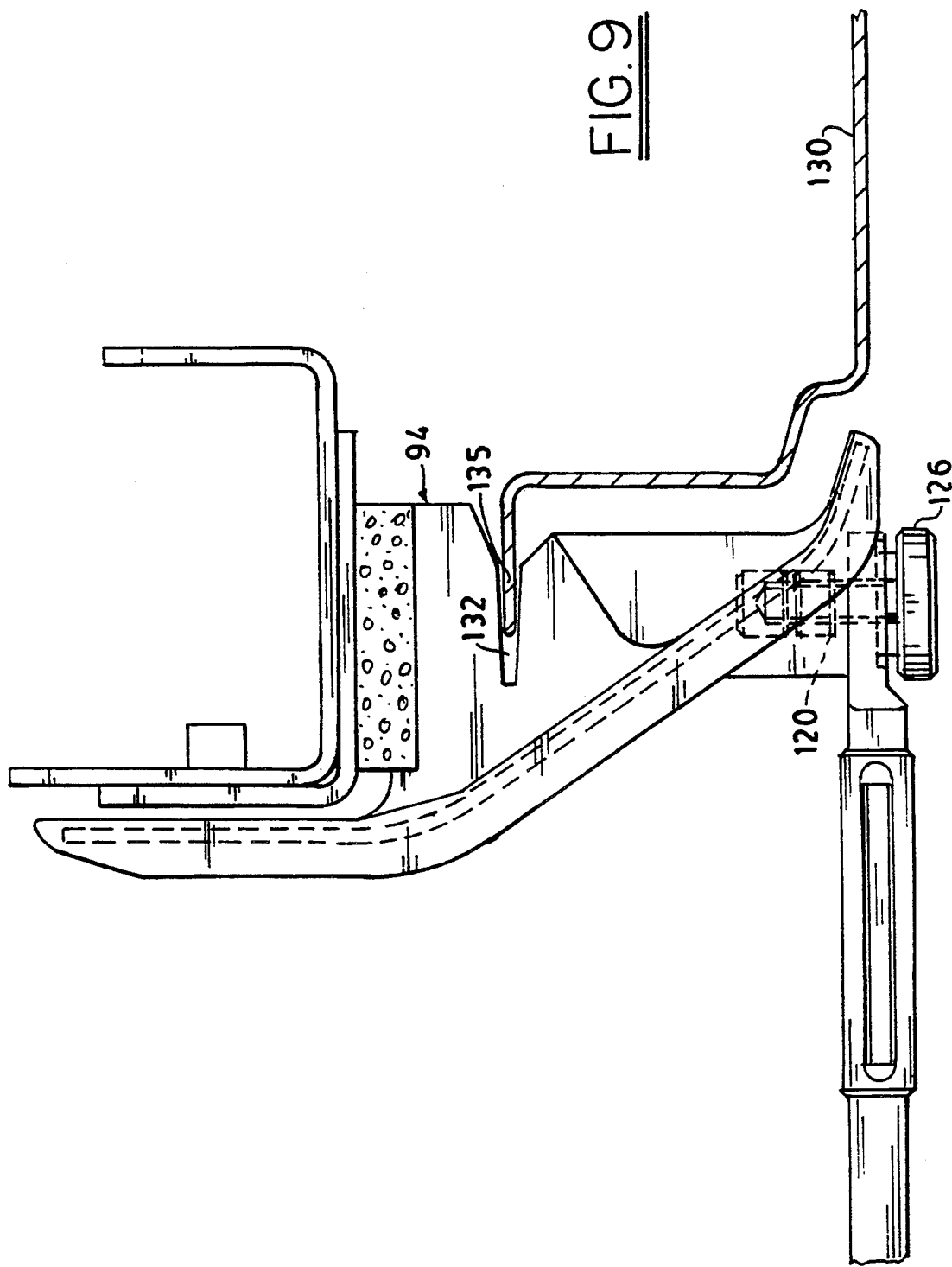
FIG. 9 is an enlarged view of FIG. 5 illustrating the right entrance guide and optional filler panel used in the narrow mode to accommodate smaller sized cassettes.
Figure 10:
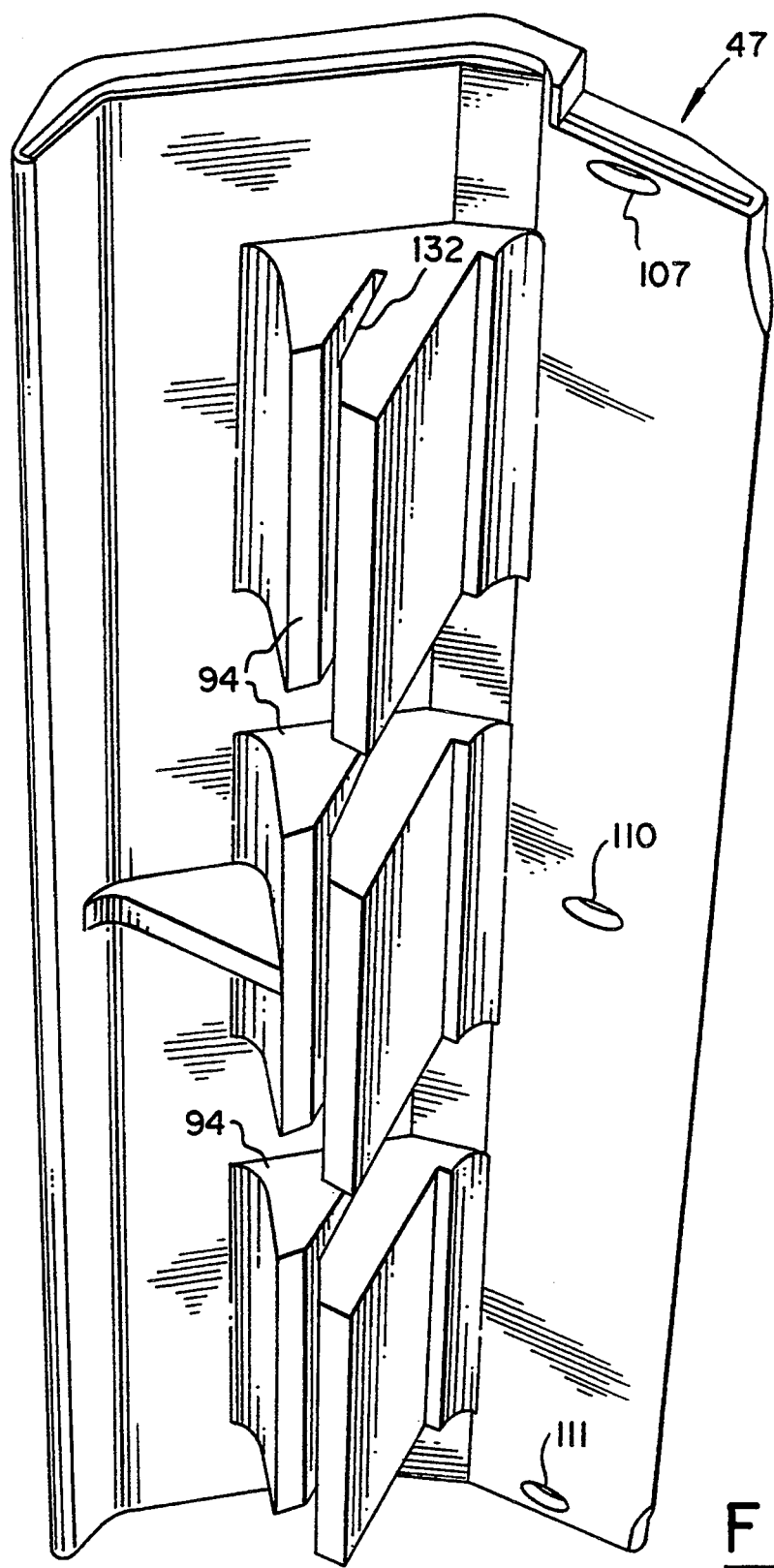
FIG. 10 is a perspective view of the rear portion of the right entrance guide panel illustrated in FIG. 9.
Figure 11:
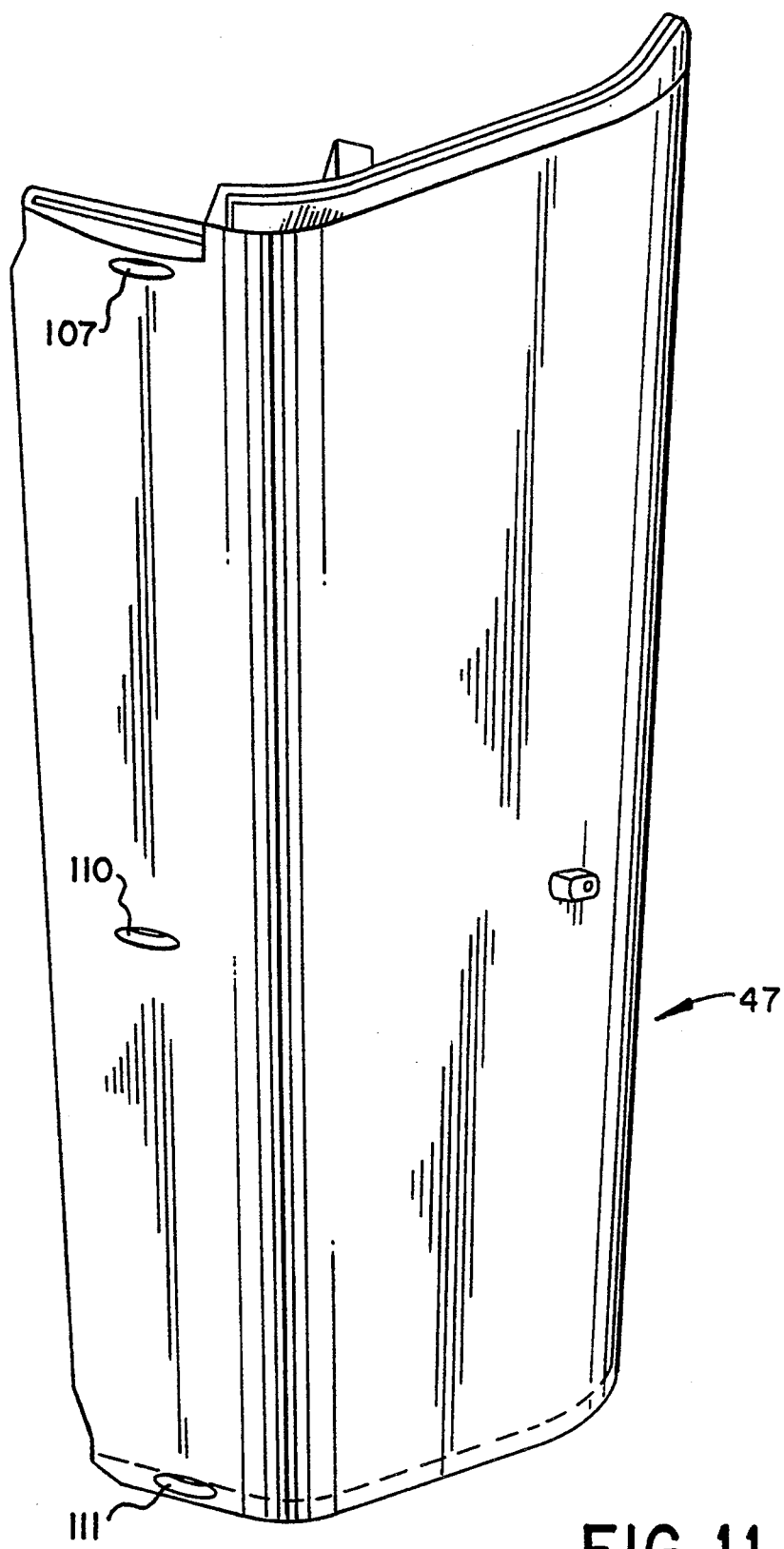
FIG. 11 is a perspective view of the front side of right entrance guide panel of FIG. 9 with the indicia not shown.
Figure 12:
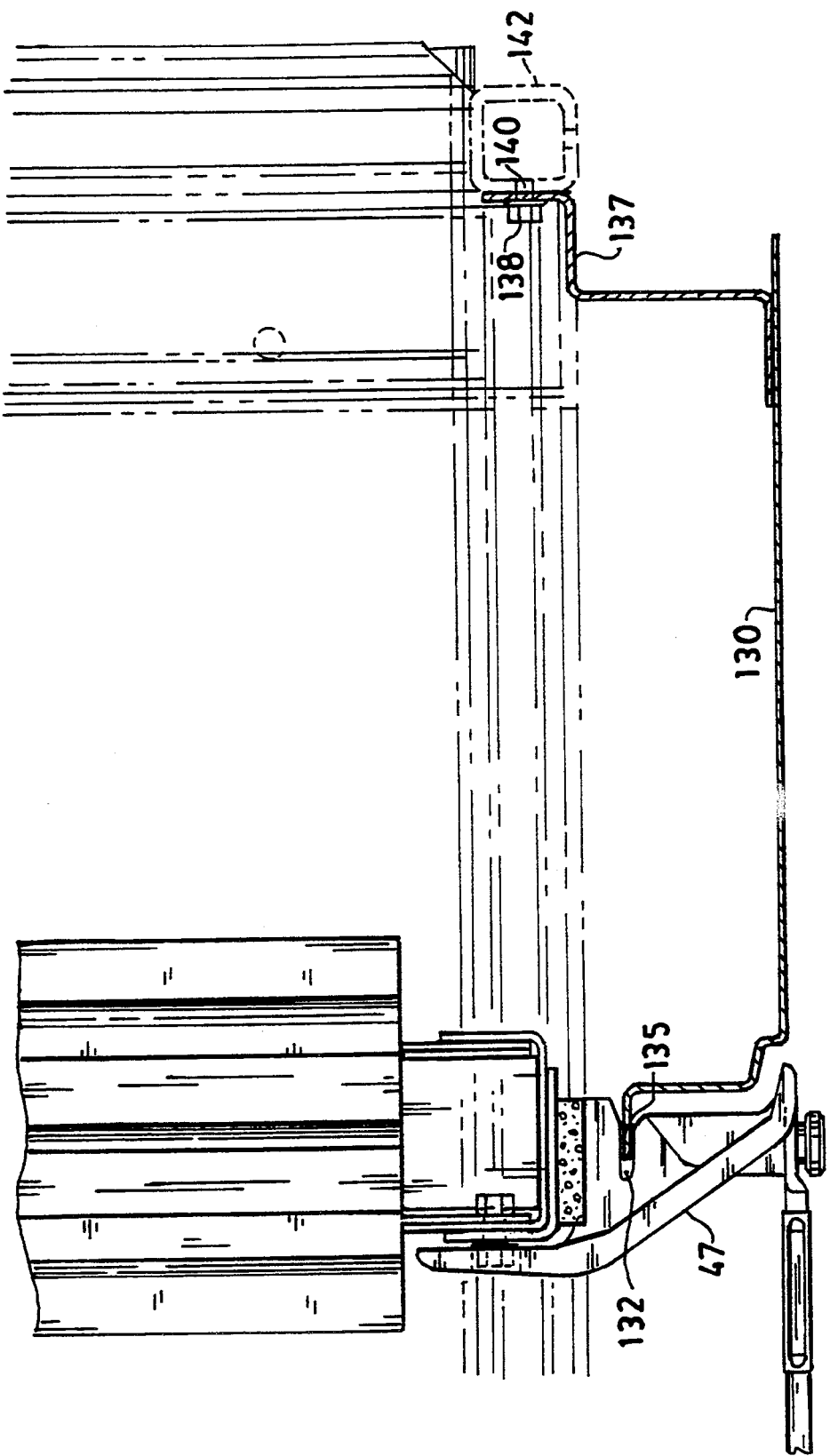
FIG. 12 is a cross-sectional view illustrating the right guide panel and filler panel and how it is mounted to the frame of the apparatus.

The guide panels (45),(47) also serve to assist in guiding the cassettes into the cassette retaining sites. As best seen by reference to FIGS. 6–14, the panels (45),(47) each comprise a guide section (68) and a rear section (70). The rear section (70) is substantially parallel to the side (72) of the adjacent cog belt which forms one side of the cassette retaining site as is best seen in FIG. 6. The left guide panel (45) is shown in FIGS. 6–8. The right guide panel (47) is similarly constructed, like numeral indicates like part,and is best illustrated in FIGS. 6 and 9–12. The guide section (68) extends from the rear mounting section (70) at an angle α with respect to a plane which is parallel to the direction of insertion of the cassette into the autoloader. The angle α may have a wide range of angles. Generally angle α ranges from about 10 degrees to about 60 degrees, preferably from about 20 degrees to about 45 degrees. In the particular embodiment illustrated angle α is about 33 degrees. As might be expected, the guide panels (45),(47) are subject to repeated hitting during insertion of the cassettes into the cassette retaining sites which can produce shock vibrations which can adversely affect the reading of the adjacent reader. In order to minimize this problem, the guide panels (45),(47) are vibration isolation mounted to the autoloader (10).

Figure 13:
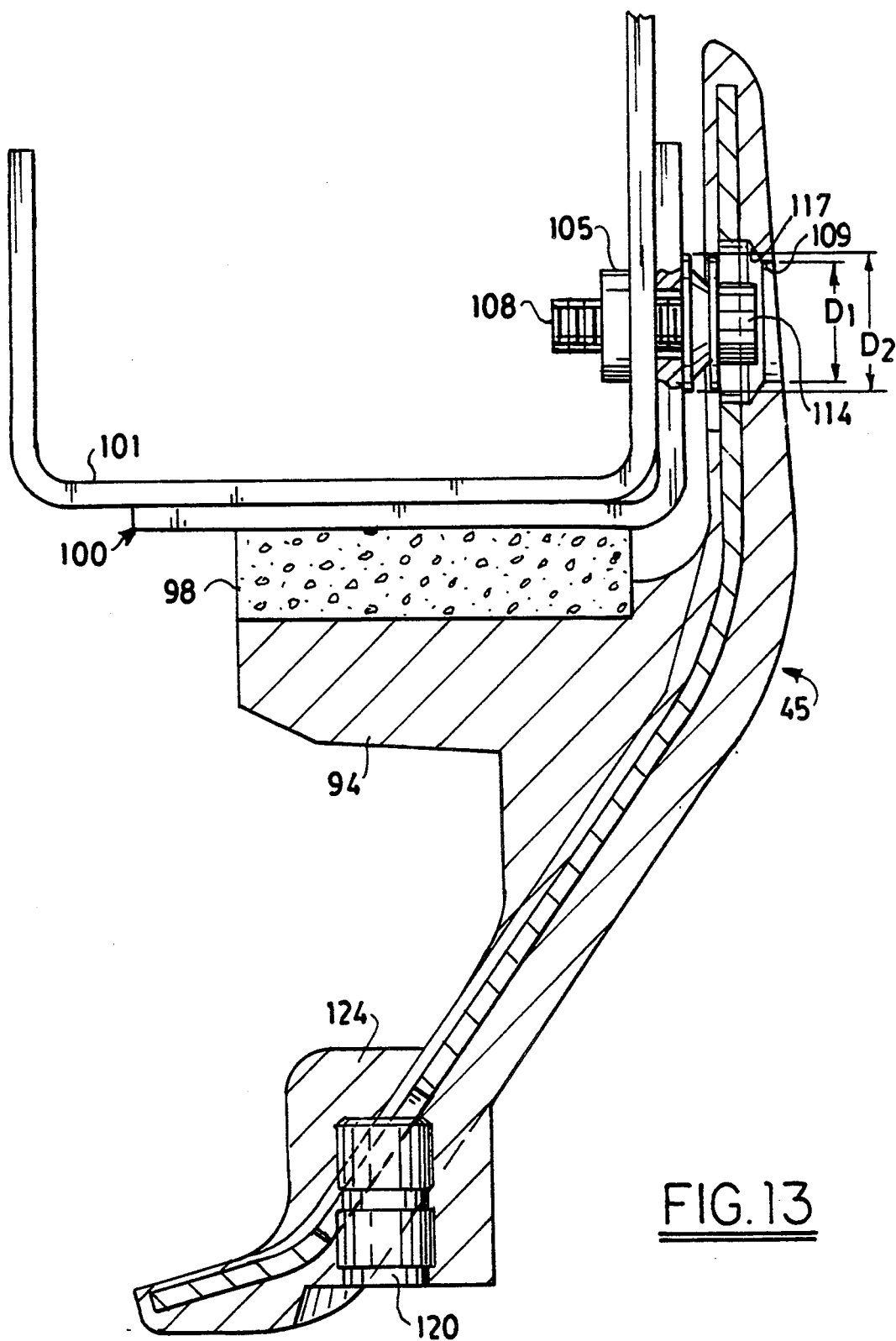
FIG. 13 is an enlarged cross-sectional view of the left guide panel illustrating how it is mounted to the frame of the apparatus and how the fastener in the central retaining opening of the guide panel is retained in position by the guide panel.
Figure 14:
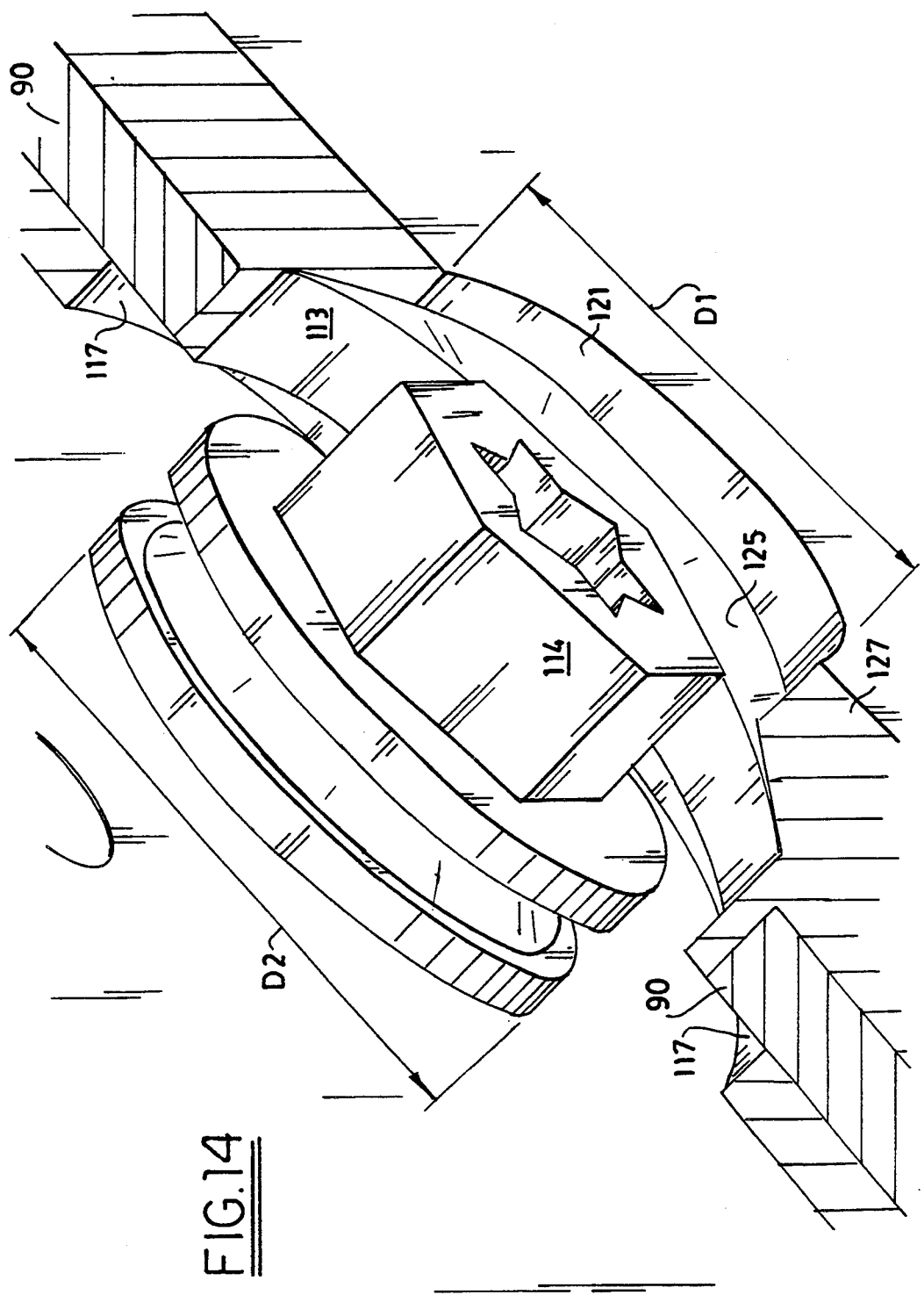
FIG. 14 is an enlarged perspective view, partially broken away, illustrating a portion of the fastener and the central retaining opening illustrated in FIG. 13.

The guide panels (45),(47) include a rigid support member (90) which is substantially encapsulate in a plastic/elastomeric material so as to form an outer protective layer (92) which covers the guide section (68) and rear mounting section (70) and form a plurality of mounting sections (94) (see FIG. 10) on the back side of the support member (90) for securing the guide panel to its associated conveyer. The rigid support member (90) provides the strength to guide panels (45),(47). Preferably, as illustrated, support member (90) is made of metal, for example, aluminum or steel. The plastic/elastomeric material may comprise a variety of different materials. Preferably, as illustrated, the plastic/elastomeric material is capable of being molded. In the embodiment illustrated a polyurethane plastic/elastomeric material is cast on the member (90). The polyurethane material should be durable to resist tears and rips and have low rebound properties so as to absorb impact and shock vibrations. The plastic/elastomeric material in the embodiment is made of a clear plastic/elastomeric and has a durometer hardness in the range from about 60 Shore A to 70 Shore D, preferably of about 90 Shore A. This allows the graphics to be placed on support member (90) by preprinted labels and to be easily viewed by the user. The graphics may be placed on support member 90 by any other desired manner, for example, by silk screen printing. In the particular embodiment illustrated mounting sections (94) each have a substantially planar mounting surface (96) designed to receive a foam pad (98). In the particular embodiment illustrated, the foam pad (98) is adhesively secured to the mounting surface (96). The other side of the mounting pad (98) is secured to a mounting anchor member (100) having a configuration design so as to mate with the corresponding frame of the adjacent conveyer. In the particular embodiment illustrated, the mounting member (100) has a generally "L" shaped configuration comprising a first section (102) and a second section (104) which is closely adjacent to the rear mount section (70). The second section (104) is provided with opening (106) which is aligned with the fastener retaining insert (105) secured to the frame (101) of the adjacent conveyer which is designed to receive the threaded shank of a fastener 108 such as a bolt or screw. As best seen by reference to FIGS. 4, 10 and 11, access openings (107),(110),(111) are provided in panels (45),(47) for securing the guide panels to the apparatus. The upper and lower openings (107),(111) are outside the working range of the cog belts whereas the center opening (110) is within the working range of the cog belts. In the embodiment illustrated in FIGS. 4, 5, 7 and 8, openings (107),(110),(111) each comprise an outer recess (113) provided in layer (92), an adjacent opening (115) in support structure (90) for receiving fastener (108) and inner opening (117) in layer (92) on the other side of member (90). The recess (103) is sized so as to receive the head (114) of the fastener (108) while openings (106),(115),(117) allows the thread shank of the fastener (108) to pass through into threaded insert (107). In the preferred embodiment, the access openings (107),(110),(111) of the guide panels (45),(47) are designed to captively retain the fasteners (108) used to secure the mounting member (100) of the adjacent conveyor. FIGS. 13 and 14 illustrate in detail opening (110) which is representative of the other openings (107),(111). The rear portion of the guide panels are designed to loosely enclose the head (114) of the fastener (108) used to secured the mounting member (100). Rather than simply provide straight access holes or notches in the guide panels (as illustrated in FIGS. 4 and 7) to allow the mounting screws to pass freely through the guide panels, the design of this embodiment provides small access holes (113) in layer (92) for access to the screw head (114) by the fastening tool. The access openings (107),(110),(111) are smaller in size (diameter) than the screw head (114) and an integral lock washer which forms captive cavities (117) which provides ample clearance for the screw head (114) so as to permit screwing and unscrewing of the fasteners (108), which holds the mounting member (100) to the rack and permits the shock mounted guide panels to deflect under impact without striking the head (114). In this embodiment the screw head (114) can not easily pass through opening (113) in the layer (92) of guide panel and thus is kept in position. In particular, opening 113 comprises a first outer opening (121) which tapers to a smaller opening (123) which forms tapered surface (125) and flexible section (127). This construction simplifies installing the guide panels to the racks since the fasteners (108) are retained in their proper position in the guide panel/-mounting member assembly. It also reduces the chance of losing the-fastener when removing the guide panels to service the racks in the field. Preferably, the diameter D1 of the openings (113),(121) in layer (92) is selected so that it is too small for the fastener head (114) to pass freely through, but large enough so that the head (114) and attached washer having a diameter D2 can be forced through the compliant polyurethane without damaging the polyurethane permanently. Typically the openings are sized such that a force of about 1 ounce to about 2 lb can be used to pass the fastener through the opening in the polyurethane. This allows initially loading the fasteners into the retaining cavities by popping them in place through polyurethane guide panels after the guide panels (45),(47), foam pads (98) and mounting member (100) are assembled together. Otherwise, the fasteners must be mounted into the clearance holes in the mounting member prior to attaching the foam pads (98) and entrance guide panel.

The layer (92) may also be made of Ultra High Molecular Weight (UHMW) polyethylene. This provides an outer surface which minimizes shearing forces applied to any label that would be used to provide the indicia on the member (90). A suitable UHMW material may be purchased from the Cadillac Plastic and Chemical Company of Troy, Mich. and typically has a molecular weight ranging from 3.1 to 5.67 million.

The guide section (68) of each panel (45),(47) is provided with a mounting insert (120) which is embedded directly in the plastic/elastomeric material such that it is isolated from the reinforcing support member (90). In particular, the mounting insert (120) is integrally formed as part of mounting section (124) when the outer layer (92) and mounting section (94) are initially molded. In the particular embodiment illustrated, the mounting insert (120) is made of brass and has internal threads for receiving the thread skank of fastener (126) such as illustrated in FIGS. 6, 7, 12, 13, 15 and 16 for securing of guard bar (49). The mounting insert (120) is fully vibration isolated from the rigid support member (90). Since the guard bar (49) is secured to each of the panels (45),(47) in the identical manner via the mounting inserts (120) molded in mounting section (124), the guard bar (49) is vibration isolated from each of the guide panels which in turn are vibration isolated from the racks by foam pads (98) which further minimizes any potential vibration that may be transmitted to the adjacent reader resulting from shocks or vibrations applied to the guard bar.

Referring to FIGS. 6, 9, 10 and 12, it can be seen that the guide panel (47) further includes means for retaining a filler panel (130) when the conveyer assembly (38) (see FIG. 3) is placed in an inner position for allowing the apparatus to secure smaller cassettes. In particular, the mounting sections (94) axe each provided with a recess/slot (132) for receiving end (135) of the filler panel. The other mounting end (137) of the filler panel (130) is mounted to the frame/body (14) of the apparatus (10). In the particular embodiment illustrated, the other end (137) is secured by screws (138) which pass through openings (140) in the end (137) which engage threaded openings in the frame (142). Having end (135) of the filler panel secured into the recess of the mounting section (94) serves to further minimize any potential vibration that may be applied to the filler panel. It is, of course, to be understood that the other end (137) may be vibration isolation mounted to the frame, for example, by the placement of an elastomeric material therebetween, which would also further serve to reduce any transmission of vibrations applied to the filler panel to the body.

Figure 15:
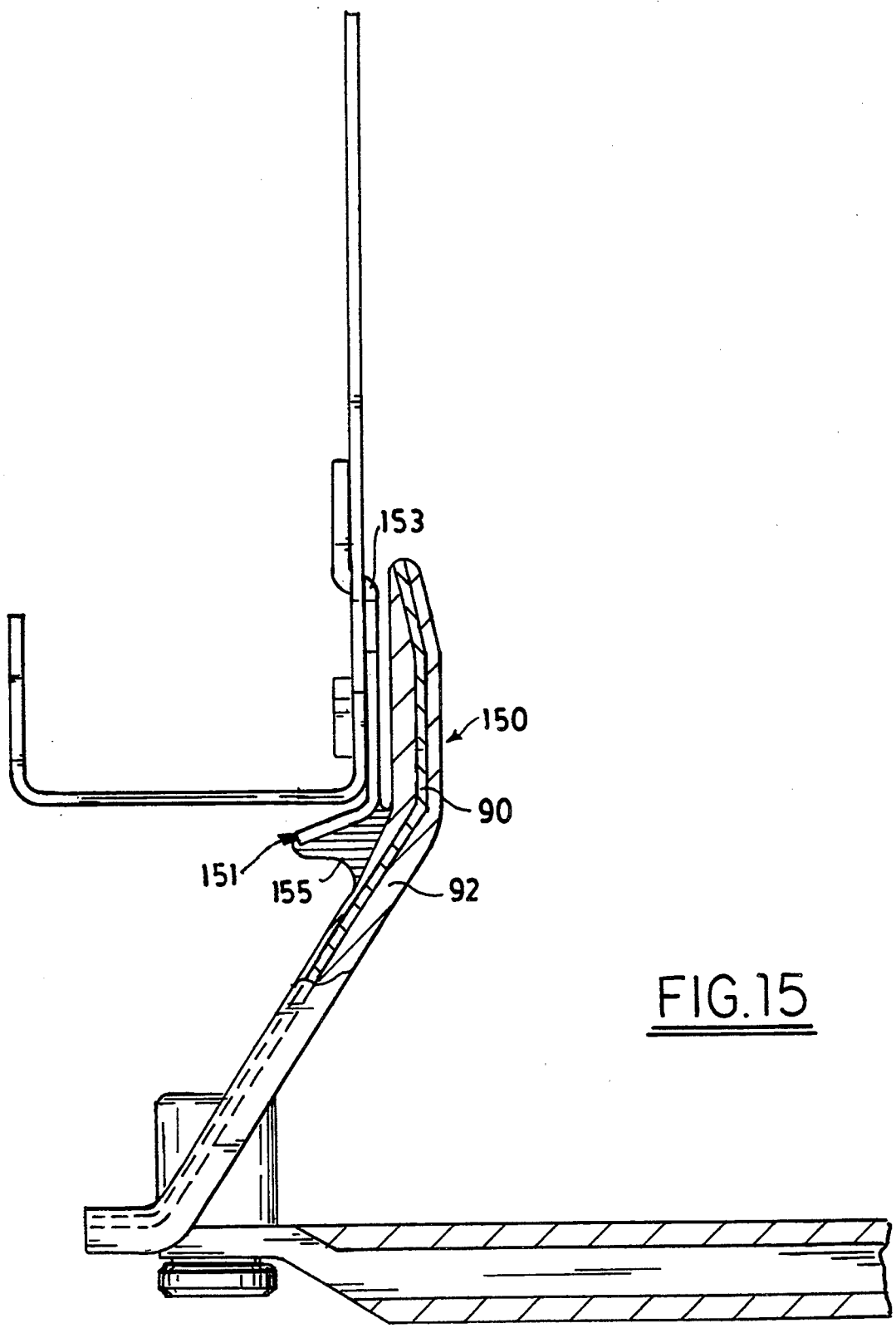
FIG. 15 is a cross-sectional of a modified guide panel made in accordance with the present invention with an integral guide anchor.
Figure 16:
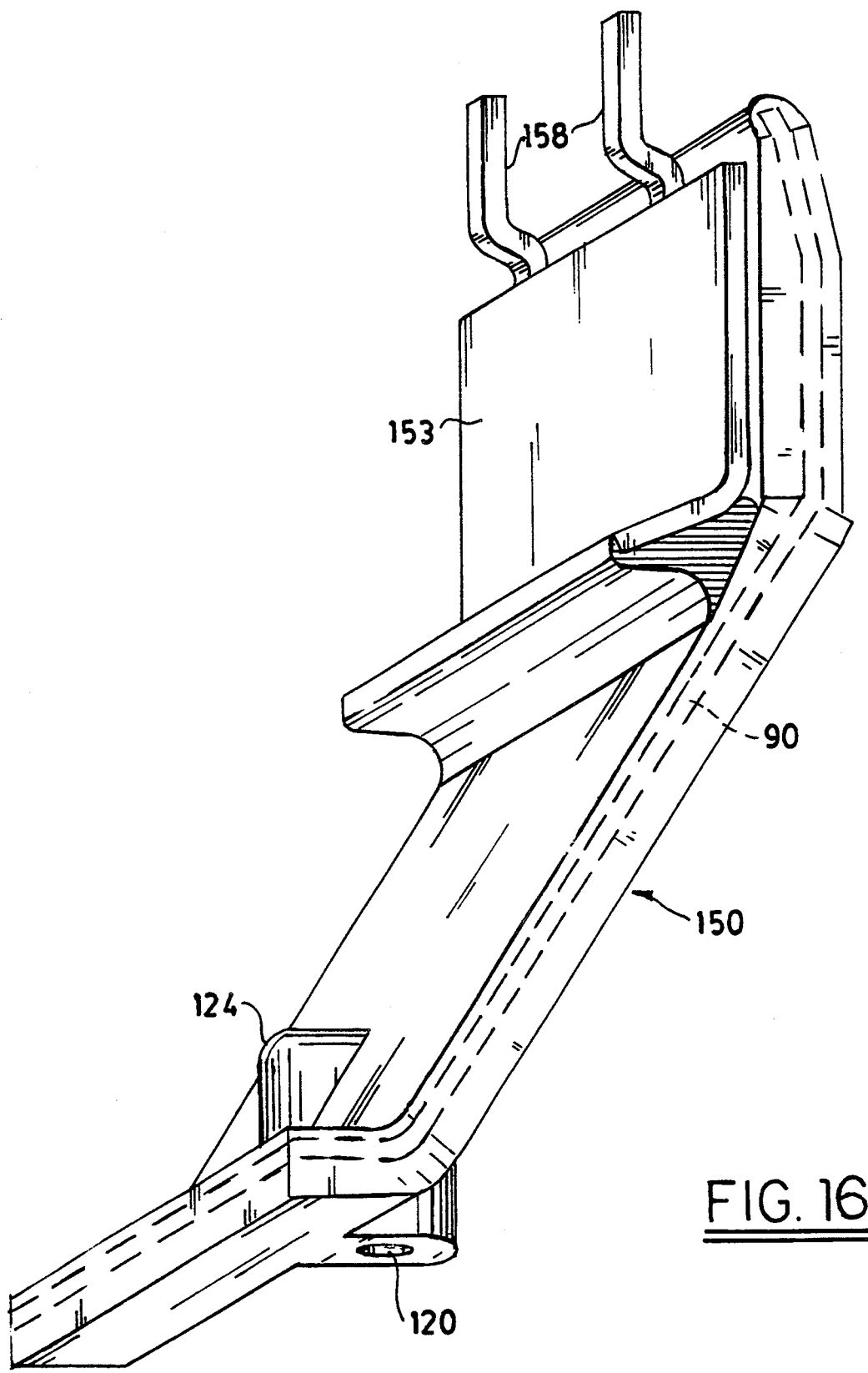
FIG. 16 is a rear perspective view of the modified guide panel of FIG. 15.

Referring to FIGS. 15 and 16, there is illustrated modified panel (150) made in accordance with the present invention. Panel (150) is similar to panels (47), like numerals indicating like parts. In this particular embodiment, the plastic/elastomeric material in which the reinforcing member (90) is embedded is provided with a mounting section (151) which is integrally part of the guide panel. Mounting section (151) includes a mounting member (153) preferably made of metal, which is integrally molded in the plastic/elastomeric material in which the support member (90) is embedded and forms a connecting section (155) therebetween. In the embodiment illustrated, mounting member (153) is shaped so as to provide a pair of anchor guides (158) which engage a pair of openings in the frame of the conveyer. The connecting section (158) is shaped so as to provide the desired flexibility.

Figure 17:
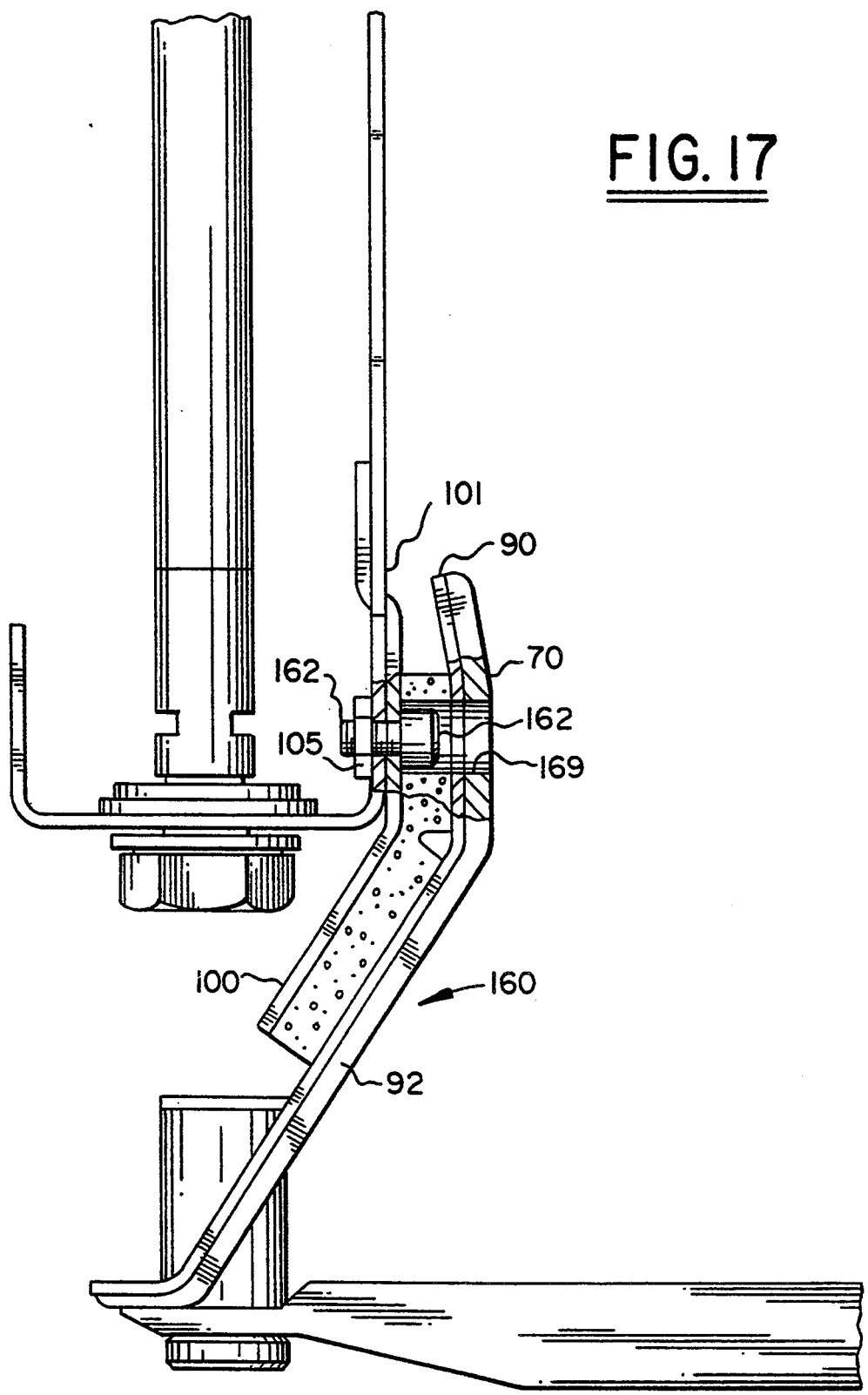
FIG. 17 is a view similar to FIG. 15 illustrating yet another modified guide panel made in accordance with the present invention.

Referring to FIG. 17, there is illustrated yet another modified form of a panel (160) made in accordance with the present invention. In this embodiment, panel (160) is provided with an outer protective layer (92) for protecting the guide section and rear section (70). Alternate means are used for mounting of the support member to the frame (101). In particular, the foam pad, has adhesive secured to both surfaces, allowing the foam pad to be secured to the support member (90) on one side and secured to the mounting member (100) on the other side which is then secured to the frame in any desired manner. In particular, the mounting members are secured through the use of a threaded screw (162) which extends through an access opening (169) in layer (92) through an opening (171) in the member (100) and is held in position by a threaded insert (175) in frame (101).

The guard bar (49) prevents cassettes from being inserted into or removed from the read site. In the embodiment illustrated, the guard bar (49) is also designed to assist the operator in placing cassettes into the autoloader. The guard bar (49) is provided with a top edge (83), the guide being positioned on the panels so that the top edge (83) corresponds with the bottom of the loading site directly above the read site. Thus, the operator can rest the front portion of a cassette on the top edge (83) and then simply slide the cassette into the adjacent loading site identified by the numeral 1. The operator can use the filled loading site 1 to further assist in identifying the next loading site directly above. The guard bar (49) is provided with cut out sections (85) to assist the operator in placing or removing cassettes in the cassette sites above and below the read site.

In all of the preferred embodiments illustrated, indicia is provided for identifying the loading and unloading sites. However, indicia may be omitted if so desired. Thus, the panel may be provided with just a protective layer (92) and/or vibration isolated inserts for mounting guard bar (49) for minimizing of shocks being transmitted from the guide panel to the body.

It is to be understood that various other changes and modifications may be made to protect the party from the scope of the present invention. The present invention being limited by the claims set forth hereinafter.

We claim:

1. In an apparatus for storing and automatically delivering cassettes and/or pallets containing cassettes to a reader comprising:
    a storage and delivery mechanism having a plurality of cassette retaining sites;
    a body encasing said storage and delivery mechanism, said body having a portal adjoining said cassette retaining sites for allowing cassettes to be placed on or removed from the storage and delivery mechanism; and
    a pair of guide panels, one on each side of the portal, said guide panels having a guide surface, said guide surface having a shock absorbing protective layer.

2. In an apparatus according to claim 1 wherein said protective layer is made of a plastic/elastomeric material.

3. In an apparatus according to claim 1 wherein said protective layer is made of a material having a hardness in the range from about 60 Shore A to 70 Shore D.

4. In an apparatus according to claim 1 further comprising a guard bar secured to said guide panels and located at a predetermined cassette retaining site, said guide panels each having an insert for securing said guard bar to said panels, said insert is vibration isolated from said guide panel in which it is mounted.

5. In an apparatus according to claim 4 wherein said insert of each guide panel is secured to its respective guide panel by a plastic/elastomer material.

6. In an apparatus according to claim 5 wherein said plastic/elastomeric material has a hardness in the range from about 60 Shore A to 70 Shore D.

7. In an apparatus for storing and automatically delivering cassettes and/or pallets containing cassettes to a reader comprising:
 a storage and delivery mechanism defining a plurality of cassette retaining sites;
 a body encasing said storage and delivery mechanism, said body having a portal adjoining said cassette retaining site for allowing cassettes to be placed on or removed from the storage and delivery mechanism;
 a pair of guide panels, one disposed on each side of the portal, characterized by said guide panels being substantially embedded in a plastic/elastomeric material.

8. In an apparatus according to claim 7 wherein said plastic/elastomeric material is polyurethane.

9. In an apparatus according to claim 8 wherein each of said panels is provided with means for capturing and retaining in position a fastening member used to secure said panel to said body.

10. In an apparatus for storing and automatically delivering cassettes and/or pallets containing cassettes to a reader comprising:
 a storage and delivery mechanism defining a plurality of cassette retaining sites;
 a body encasing said storage and delivery section, said body having a portal adjoining said cassette retaining sites for allowing cassettes to be placed on or removed from the storage and delivery section;
 a pair of guide panels secured to said body adjacent said portal, said guide panels having indicia thereon for identifying said cassette retaining sites, each of said guide panels being substantially encapsulated in a plastic/elastomeric material.

11. In an apparatus according to claim 10 wherein said plastic/elastomeric material has a hardness in the range from about 60 Shore A to 70 Shore D.

12. In an apparatus according to claim 10 further comprising a guard bar secured to said guide panels and located at a predetermined cassette retaining site, said guide panels each having an insert for securing said guard bar to said panels, said insert is vibration isolated from said guide panel in which is mounted.

13. In an apparatus according to claim 12 wherein said insert of each panel is secured to its respective panel by a plastic/elastomeric material.

14. In an apparatus according to claim 13 wherein said plastic/elastomeric material has a hardness in the range from about 60 Shore A to 70 Shore D.

15. In an apparatus for storing and automatically delivering cassettes and/or pallets containing cassettes to a reader comprising:
 first and second conveyors, said conveyors having a first endless cog belt and a second endless cog belt, respectively, said cog belts being spaced apart, said cog belts each having a plurality of outwardly extending shelves, said conveyors each having a pair of cogwheels, each said pair of cogwheels receiving a respective said endless cog belt, each said cog belt having a utilization segment and a return segment, said shelves of said utilization segment of said first cog belt facing and being in vertical alignment with corresponding shelves of said utilization segment of said second cog belt, said aligned shelves defining a cassette read site and a plurality of cassette retaining sites, a positive drive operatively connected to both said conveyors, said positive drive driving said conveyors in unison to transfer cassettes loaded in said cassette retaining sites serially through said cassette retaining sites and said cassette read site, and a body encasing said conveyors, said body having a portal adjoining said cassette retaining sites;
 at least one guide panel secured to said body adjacent said portal, said guide panel having indicia thereon for identifying said cassette retaining sites for receiving said cassettes, said at least one guide panel having a layer of protective material over said indicia.

16. In an apparatus according to claim 15 wherein a guard bar is secured to said at least one guide panel, said at least one guide panel having a vibration isolation structure for minimizing vibrations transferring from said guard bar to said guide panel.

17. In an apparatus according to claim 15 wherein said guide panel is substantially encased in a plastic/elastomeric material, said plastic/elastomeric material forming a mounting section for mounting of said panel to a supporting structure on said apparatus.

18. In an apparatus according to claim 17 wherein said plastic/elastomeric material in which said panel is encased is further provided with means for mounting one side of a guard bar.

19. In an apparatus according to claim 18 wherein said mounting means has a mounting surface for receiving a foam layer for securing said panel to a mounting bracket.

20. In an apparatus according to claim 19 wherein said foam layer is secured to a mounting bracket which is used to secure the panel to the body.

21. In an apparatus for storing and automatically delivering cassettes and/or pallets containing cassettes to a reader comprising:
 storage and delivery means defining a plurality of cassette retaining sites;
 a body encasing said storage and delivery means, said body having a portal adjoining said cassette retaining sites for allowing cassettes to be placed on or removed from the storage and delivery means;
 a pair of guide panels, one on each side of the portal, said guide panels each having a mounting insert, said insert of said guide panels being vibration isolation mounted to its associated said guide panel; and
 a guard bar secured to said mounting inserts of guide panels.

22. In an apparatus for storing and automatically delivering cassettes and/or pallets containing cassettes to a reader comprising:
 storage and delivery means defining a plurality of cassette retaining sites;
 a body encasing said storage and delivery means, said body having a portal adjoining said cassette retaining sites for allowing cassettes to be placed on or removed from the storage and delivery means; and
 a pair of guide panels, one on each side of the portal, said guide panel is substantially encased in a plastic- /elastomeric material, said plastic/elastomeric material forming a mounting section for mounting of said guide panel to a supporting structure on said apparatus.

23. In an apparatus according to claim 22 wherein said mounting section has a mounting surface for receiving a foam layer for securing said panel to a mounting bracket.

24. In an apparatus according to claim 23 wherein said foam layer is secured to a mounting bracket which is used to secure the panel to the body.

25. In an apparatus according to claim 22 wherein said plastic/elastomeric material in which said guide panel is encased is further provided with mounting means for securing one side of a guard bar.

26. In an apparatus according to claim 22 wherein said mounting section includes a mounting member secured to said mounting section.

* * * * *